United States Patent
Rajagopal et al.

(10) Patent No.: US 8,556,303 B2
(45) Date of Patent: Oct. 15, 2013

(54) BATTERY COVER AND PIVOTING LATCH ASSEMBLY FOR A PORTABLE ELECTRONIC DEVICE

(75) Inventors: Vijai Rajagopal, Ahmedabad (IN); James Carl Infanti, Waterloo (CA); Timothy Herbert Kyowski, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 406 days.

(21) Appl. No.: 12/543,878

(22) Filed: Aug. 19, 2009

(65) Prior Publication Data

US 2011/0042970 A1     Feb. 24, 2011

(51) Int. Cl.
*E05C 19/10* (2006.01)
*E05C 19/00* (2006.01)

(52) U.S. Cl.
USPC ............. 292/128; 292/11; 292/54; 292/121; 292/228; 292/304; 429/97; 429/100

(58) Field of Classification Search
USPC .......... 292/44, 300, 303, 304, 11, 13, 31, 54, 292/87, 89, 121, 101, 107, 108, 128, 209, 292/228, 240–242; 429/96, 97, 100; 16/374; 361/801–803, 732, 747, 361/679.58; 379/443.08; 455/572–574, 455/575.1
See application file for complete search history.

(56) References Cited

U.S. PATENT DOCUMENTS

| | | | | |
|---|---|---|---|---|
| 188,311 | A | * | 3/1877 | Sparks .......................... 292/128 |
| 274,497 | A | * | 3/1883 | Judson .......................... 292/121 |
| 294,778 | A | * | 3/1884 | Ford et al. ..................... 292/128 |
| 5,044,810 | A | * | 9/1991 | Matsuoka et al. .............. 403/93 |
| 5,213,913 | A | | 5/1993 | Anthony, III et al. |
| 5,314,763 | A | | 5/1994 | Aksoy et al. |
| 5,460,906 | A | | 10/1995 | Leon et al. |
| 5,607,792 | A | | 3/1997 | Garcia et al. |
| 5,689,824 | A | * | 11/1997 | Nagai ........................ 455/575.3 |

(Continued)

FOREIGN PATENT DOCUMENTS

| | | |
|---|---|---|
| EP | 0986232 A2 | 3/2000 |
| EP | 1463275 A1 | 9/2004 |

(Continued)

OTHER PUBLICATIONS

European Search Report for Application No. 09168165.0, mailed Jan. 12, 2010.

*Primary Examiner* — Carlos Lugo
*Assistant Examiner* — Alyson M Merlino
(74) *Attorney, Agent, or Firm* — Quarles & Brady LLP

(57) ABSTRACT

An apparatus secures a cover onto a housing of a portable electronic device. The apparatus has a first latch that is pivotally connected to the cover by a first hinge, so that in a first rotational position, the first latch contacts a first catch on the housing and in a second rotational position, the first latch is remote from the first catch. A second latch assembly has a second latch that is pivotally connected to the cover by a second hinge, so that in one rotational position, the second latch contacts a second catch on the housing and in another rotational position, the second latch is remote from the second catch. By squeezing the first and second latches between two fingers, a user is able to disengage those latches from the catches and remove the cover from the housing.

22 Claims, 3 Drawing Sheets

(56) References Cited

U.S. PATENT DOCUMENTS

| | | | |
|---|---|---|---|
| 5,785,398 A * | 7/1998 | Park | 312/223.2 |
| 5,895,729 A | 4/1999 | Phelps, III et al. | |
| 6,730,432 B1 | 5/2004 | Grosfeld et al. | |
| 6,808,842 B2 | 10/2004 | Siddiqui et al. | |
| 6,935,661 B1 * | 8/2005 | Farnsworth et al. | 292/162 |
| 7,419,742 B2 | 9/2008 | Liu et al. | |
| 2004/0192106 A1 | 9/2004 | Britz | |
| 2005/0221654 A1 | 10/2005 | Phillips et al. | |
| 2006/0175840 A1 * | 8/2006 | Wang et al. | 292/228 |
| 2007/0010219 A1 | 1/2007 | Qin et al. | |
| 2007/0087263 A1 | 4/2007 | Ge et al. | |
| 2008/0193837 A1 | 8/2008 | Lu | |
| 2008/0268329 A1 | 10/2008 | Mackle et al. | |
| 2010/0028763 A1 * | 2/2010 | Zhou et al. | 429/100 |
| 2010/0244464 A1 * | 9/2010 | Rajagopal et al. | 292/163 |

FOREIGN PATENT DOCUMENTS

| | | |
|---|---|---|
| WO | 00/08698 | 2/2000 |
| WO | 0008698 A1 | 2/2000 |
| WO | WO 2007069552 A1 * | 6/2007 |

* cited by examiner

BATTERY COVER AND PIVOTING LATCH ASSEMBLY FOR A PORTABLE ELECTRONIC DEVICE

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE DISCLOSURE

1. Field of the Disclosure

The present disclosure relates to portable electronic devices, including, but not limited, to handheld wireless communication devices; and more particularly to a cover by which a user gains access to a battery compartment in such a device.

2. Description of the Related Art

Certain portable electronic devices, handheld wireless communication devices in particular, are battery powered. The device typically has a metal or plastic housing with a compartment for the battery. A cover releasably engages the housing over the compartment to enable the user to access the battery for replacement. In conventional devices, the cover generally is closed by sliding it along a recess in the housing. As that sliding occurs, hook shaped tabs on the cover engage apertures in the housing and then travel into smaller sections of the apertures in which the tabs are captivated. Such captivation holds the cover on the housing.

Sliding the cover in the opposite direction moves the tabs into the larger sections of the apertures enabling the cover to be moved away from the housing. In that manner, the cover can be removed to open the battery compartment.

Because the cover must be secured tightly to the housing, some users find it physically challenging to slide the cover of conventional devices off and on the housing.

DETAILED DESCRIPTION

A portable electronic device has a housing with a battery compartment that is closed by a cover. The cover has at least one and preferably two spring-loaded latch assemblies that are pivotally located along opposite edges of the cover. In the normal positions, tabs on the latch assemblies extend under catches on the housing to hold the cover in place.

The user is able to simultaneously depress the two latch assemblies and pivot the tabs from their normal positions away from engagement with the catches. This permits the cover to be lifted outward and removed from the housing, thereby exposing the battery compartment.

Figure 1:
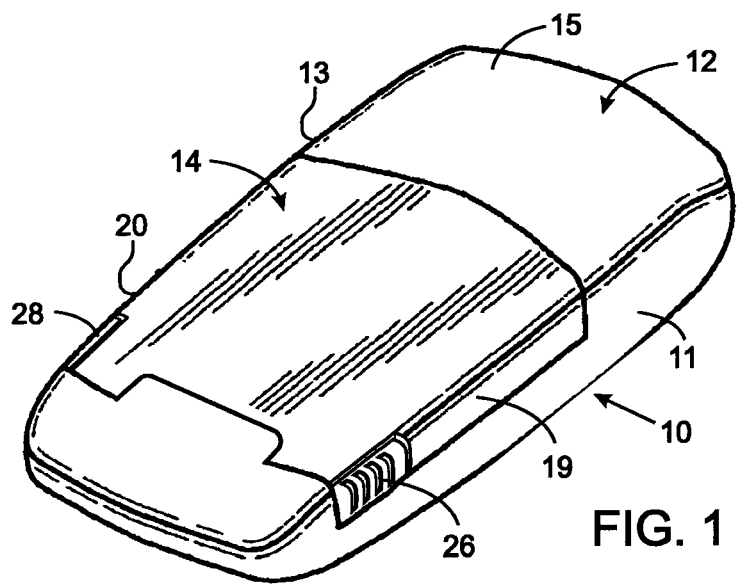
FIG. 1 is a perspective view of a rear side of a portable electronic device showing the cover over a battery compartment defined in a housing.

With initial reference to FIG. 1, a portable electronic device 10, such as a handheld wireless communication device, for example, includes a housing 12 with a cover 14. The cover 14 preferably is made of metal, while the housing may be either metal or molded plastic, although it is contemplated that alternative materials with similar properties may be appropriate. The cover 14 is removably secured over a battery compartment or opening 23 (see FIG. 6) defined in the housing 12. Specifically the cover 14 fits into a recess 25 defined in the housing 12 that surrounds the battery compartment 23, thus when in place, the cover is flush with the exterior surfaces of the housing. The cover extends across a rear surface 15 of the housing 12 and wraps around onto two side surfaces 11 and 13. First and second latch assemblies 26 and 28 are slideably located along opposite edges of the cover 14 and engage the housing 12 to secure the cover in place.

Figure 2:
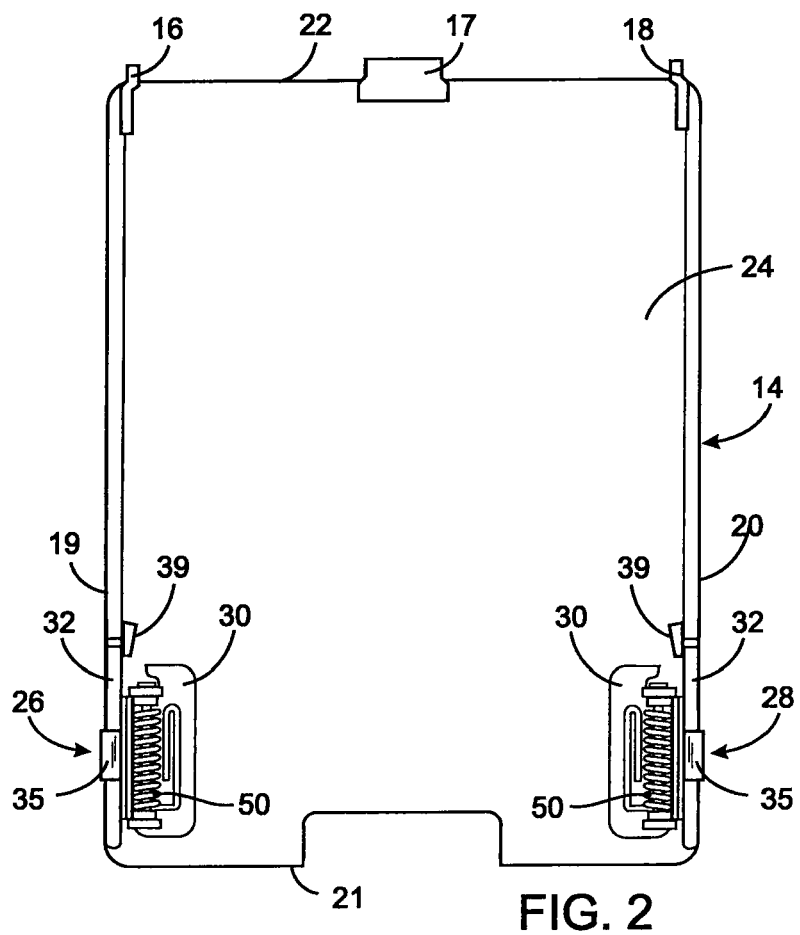
FIG. 2 illustrates the inside major surface of the cover showing latch assemblies for holding the cover on the housing.

With additional reference to FIG. 2, the cover 14 has opposing first and second edges 19 and 20 spaced apart and extending along the length of the cover. Third and fourth edges 21 and 22 extend between the first and second edges 19 and 20 on opposite sides of the cover. A set of three fixed prongs 16, 17 and 18 project from the fourth edge 22 which extends across the width of the housing 12 when the cover 14 is in place. The first and third fixed prongs 16 and 18 are adjacent the first and second edges 19 and 20 of the cover 14 and the second fixed prong 17 is located substantially at the middle of the fourth edge 22, although it is appreciated that the prongs 16-18 are not limited to the above-described orientation. The fixed prongs 16-18 project outward from the cover and engage corresponding holes or a rim (not shown) of the housing 12 to hold the fourth edge 22 in place. A lesser or greater number of fixed prongs may be provided as required to hold the fourth edge 22 in place.

The releasable first latch assembly 26 is located on the inside surface 24 of the cover 14 along the first edge 19 proximate a corner with the third edge 21. The releasable second latch assembly 28 is similarly located along the second edge 20 proximate an opposing corner with the third edge 21. As will be described, the first and second latch assemblies 26 and 28 also engage the housing 12 to hold the cover 14 in place and can be manually operated to disengage the housing in order to remove the cover 14.

The first and second latch assemblies 26 and 28 have identical construction, but are mirror images of each other. Thus the first latch assembly 26 shown in FIG. 3 will be described in detail, with the understanding that the description applies equally to the second latch assembly 28.

Figure 4:
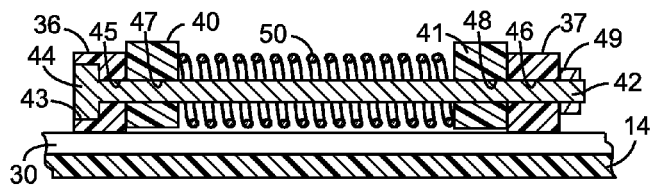
FIG. 4 is a cross sectional view through a hinge of one of the latch assemblies.

The first latch assembly 26 includes a base 30 and a latch 32 that are coupled to each other by a hinge 34. Although other configurations may be suitable, the base 30 and the latch 32 are arranged substantially perpendicular to each other. Specifically, the base 30 is secured to the major inside surface 24 of the cover 14, such as by an adhesive or by welding, for example. The base 30 has a first base knuckle 36 and a second base knuckle 37 projecting therefrom. The pair of base knuckles 36 and 37 are spaced apart and form parts of the hinge 34. With additional reference to FIG. 4, the first base knuckle 36 has a first aperture 45 there through and a second base knuckle 37 has a second aperture 46 there through.

Figure 5:
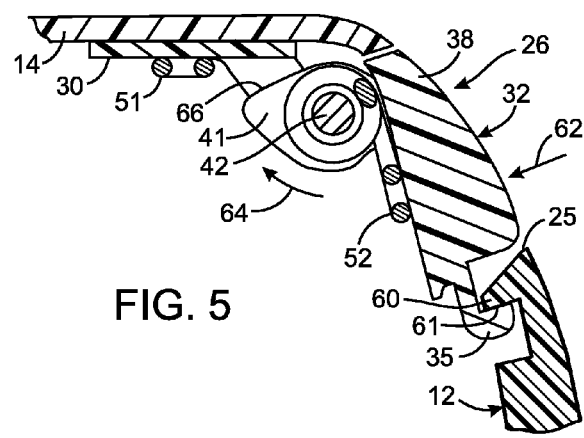
FIG. 5 is a partial cross sectional view depicting engagement of a latch assembly with the housing.

The latch 32 has a plate 38 that extends aligned with the first edge 19 of the cover 14. The plate 38 has a hook-like tab 35 projecting from a rim 33 of the plate. With reference to FIG. 5, when the cover 14 is secured to the housing 12, the hook-like tab 35 of the first latch assembly 26 engages a corresponding first catch 60 that has a first catch area 61 on the housing 12. The housing 12 has a similar second catch 57 and a second catch area 59, shown in FIG. 6, for the second latch assembly 28. Returning to FIGS. 3 and 4, first and second latch knuckles 40 and 41 project inwardly from the plate 38 and are located between the two base knuckles 36 and 37. The first and second latch knuckles 40 and 41 also are parts of the hinge 34. The first latch knuckle 40 has a third aperture 47 there through and the second latch knuckle 41 has a similar fourth aperture 48. The four apertures 45-48 in the base and latch knuckles are aligned and have a hinge pin 42 passing there through to connect the knuckles and allow the latch 32 to pivot with respect to the base 30. To retain the hinge pin 42, the hinge pin has an enlarged head 44 at one end that fits within a corresponding enlarged countersunk portion 43 defined in the first aperture 45 of the first base knuckle 36. Further, a collar 49 is crimped onto the exposed opposite end of the hinge pin 42 to hold the pin in the set of knuckles. The latch 32 is able to pivot about the hinge pin 42 into different rotational positions with respect to the base 30 and therefore also with respect to the cover 14, as will be described in further detail below.

Figure 3:
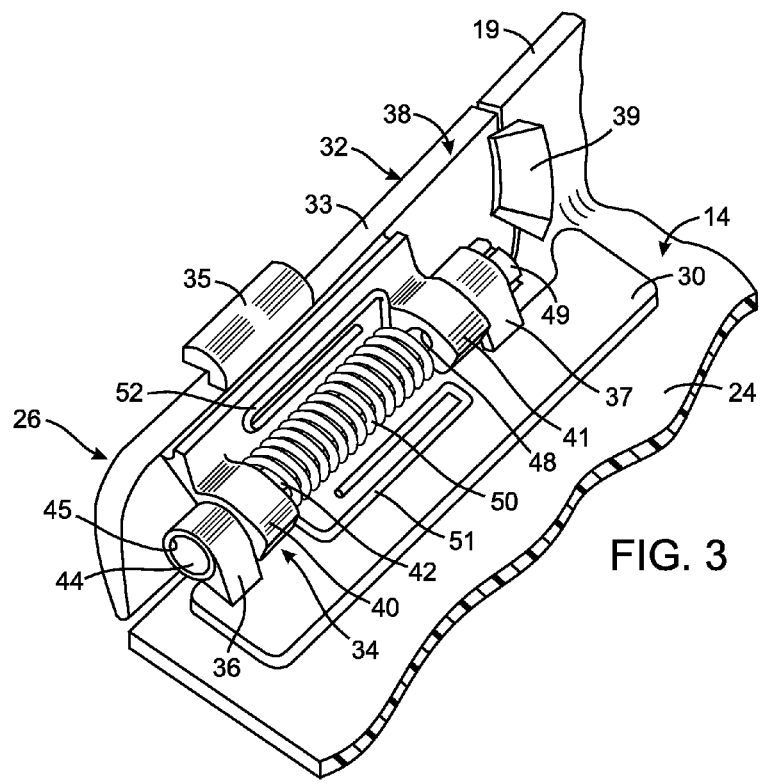
FIG. 3 is an enlarged view of one of the latch assemblies on a cover that has been removed from the housing.

A torsion spring 50 is located in a space defined between the first and second latch knuckles 40 and 41 and has the hinge pin 42 passing there through. One end section 51 of the torsion spring 50 abuts the base 30 and the opposite end section 52 abuts an inside surface of the latch plate 38. The latch plate 38 has a stop 39 that projects laterally parallel to the first edge 19. The force exerted by the torsion spring 50 biases the latch 32 into a first rotational position with respect to the base 30 in which the stop 39 on the latch plate 38 abuts the inside surface of the first edge 19 of the cover, as shown in FIG. 3. The stop 39 restricts that bias and limits the rotational motion in a first direction to position the latch plate generally coplanar with the first edge 19 when the cover is removed from the housing.

With reference to FIGS. 1 and 5, when the user of the portable electronic device 10 desires to open the cover 14, the user grasps the first and second latch assemblies 26 and 28 between a thumb and an index finger and squeezes those fingers together thereby depressing both those latch assemblies. With particular reference to FIG. 5, that squeezing motion applies a force, indicated by arrow 62, to the plate 38 of each latch assembly 26 and 28, causing the respective latch 32 to rotate about the hinge pin 42 in a direction indicated by arrow 64. The rotation of the first latch 32, and likewise the similar second latch of the second latch assembly 28, is limited by the shape of the first and second latch knuckles 40 and 41. Specifically, such a shape is similar to the lobe of a cam and has a cam surface 66 shown in FIG. 5, that in an extreme inward rotational position about the hinge pin 42 strikes the base 30 to stop further rotation. This cam surface 66 thus limits the inward rotational motion of each latch 32 in a second direction, thereby preventing damage to internal components of the portable electronic device 10. Squeezing the first and second latch assemblies 26 and 28 together to open the battery compartment is less physically challenging as compared to the slide mechanism described above for similar conventional devices.

Figure 6:
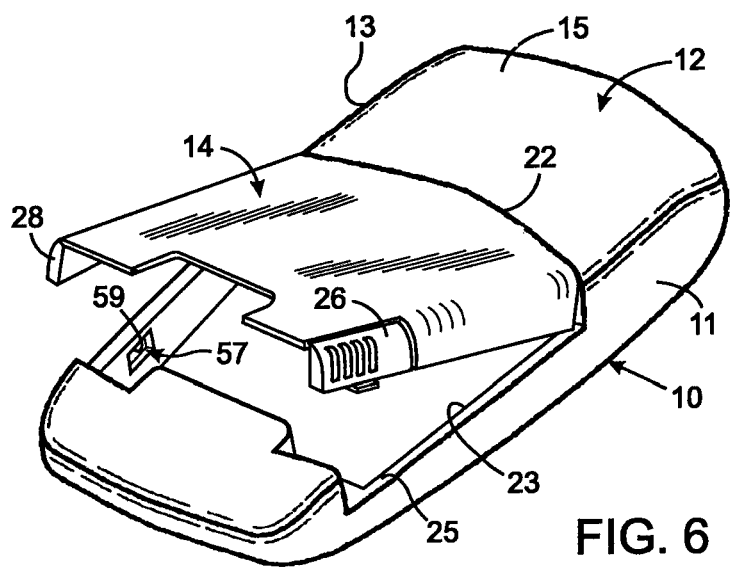
FIG. 6 shows the cover partially removed from the housing.

The rotational motion causes the latch 32 to pivot away from engagement with the first catch 60 on the housing 12. In a second rotational position of the latch 32 at which the tab 35 has cleared the first catch 60 and its first catch area 61, the user is able to lift the third edge 21 of the cover 14 away from the housing 12, as shown in FIG. 6. After the cover 14 has been lifted sufficiently, the user can pull the fourth edge 22 of the cover away from the housing 12. This pulling action frees the three fixed prongs 16, 17, and 18 on the underside of the cover (FIG. 2) from the housing, thereby enabling the cover 14 to be completely removed. The cover can be reinstalled on the housing by reversing the removal steps.

The present latching mechanism for the cover 14 employs two separate latch assemblies 26 and 28 so that should one of them fail, the other still secures the cover 14 to the housing 12. The cam surface 66 inhibits each of the first and second latch assemblies 26 and 28 from being damaged due to over squeezing by the user. Both the stop 39 and the cam surface 66 act to prevent excessive rotational travel of the respective latch 32. Nevertheless, should damage to the first and second latch assemblies 26 and 28 occur, the repair is easily effected by replacing the cover 14. This offers an advantage over previous cover designs in which the latch mechanism was incorporated into the housing of the portable electronic device and thus required that the entire housing be replaced or at least taken apart for repair, neither of which is something that a user should do.

The foregoing description was primarily directed to a preferred embodiment of the present latch assembly. Although some attention was given to various alternatives within the scope of the disclosure, it is anticipated that one skilled in the art will likely realize additional alternatives that are now apparent from disclosure of embodiments of the present latch assembly. Accordingly, the scope of the disclosure should be determined from the following claims and not limited by the above disclosure.

The invention claimed is:

1. A portable electronic device comprising:
   a housing having a compartment adapted for containing a battery to power the portable electronic device and having an opening into the compartment;
   a cover detachably attached to the housing over the opening, wherein the cover has opposing outside and inside surfaces and opposing first and second edges between which third and fourth edges extend, wherein a portion of the inside surface extends across the opening when the cover is attached to the housing;
   a first latch assembly comprising a first latch with a first latch plate that is pivotally coupled to the cover along the first edge, the first latch assembly having a first pair of latch knuckles projecting from the first latch plate and each having an aperture therein, a first pair of base knuckles mounted on the portion of the inside surface of the cover and each having an aperture therein, a first hinge pin extending into the apertures in the first pair of latch knuckles and the first pair of base knuckles, a first spring arranged to bias the first latch rotationally into releasable engagement with the housing, and a first stop projecting from the first latch plate for engaging a first surface of the first edge of the cover to limit rotational motion of the first latch plate in a first direction, wherein the first surface faces toward the housing; and
   a second latch assembly comprising a second latch with a second latch plate that is pivotally coupled to the cover along the second edge, the second latch assembly having a second pair of latch knuckles projecting from the second latch and each having an aperture therein, a second pair of base knuckles mounted on the portion of the inside surface of the cover and each having an aperture therein, a second hinge pin extending into the apertures in the second pair of latch knuckles and the second pair of base knuckles, a second spring arranged to bias the second latch rotationally into releasable engagement with the housing, and a second stop projecting from the second latch plate for engaging a second surface of the second edge of the cover to limit rotational motion of the second latch plate in a first direction, wherein the second surface faces toward the housing.

2. The portable electronic device as recited in claim 1 wherein each of the first spring and the second spring is a torsion spring through which the respective hinge pin extends.

3. The portable electronic device as recited in claim 1 wherein each of the first spring and the second spring is a torsion spring.

4. The portable electronic device as recited in claim 1 wherein each of the first and second pairs of latch knuckles limits rotational motion in a second direction of the first and second latch assemblies, respectively.

5. The portable electronic device as recited in claim 1 wherein:
the housing has a first catch and a second catch on inside surfaces of the housing;
the first latch has a first tab that releasably engages the first catch to hold the cover against the housing; and
the second latch has a second tab that releasably engages the second catch to hold the cover against the housing.

6. The portable electronic device as recited in claim 1 wherein the first and second latch assemblies are proximate to the third edge; and further comprising at least one prong attached to the cover and projecting from the fourth edge into releasable engagement with the housing.

7. The portable electronic device as recited in claim 1 wherein the cover conceals the first and second pairs of base knuckles from view when the cover is attached to the housing.

8. The portable electronic device as recited in claim 1 wherein the first stop projects laterally from the first latch plate parallel to the first edge; and second stop projects laterally from the second latch plate parallel to the second edge.

9. A portable electronic device comprising:
a housing having a compartment adapted for containing a battery to power the portable electronic device and having an opening into the compartment;
a cover detachably attached to the housing over the opening, wherein the cover has opposing outside and inside surfaces;
a first latch assembly that comprises:
(a) a first base mounted on the inside surface of the cover and having a first pair of base knuckles projecting from the first base, each base knuckle having a separate aperture there through, wherein the first base and the first pair of base knuckles are concealed from view when the cover is attached to the housing;
(b) a first latch including a first plate from which projects a first pair of latch knuckles, each having a separate aperture there through, and including a first stop projecting from the first plate for engaging a first surface of a first edge of the cover to limit rotational motion of the first plate in a first direction, wherein the first surface faces toward the housing;
(c) a first hinge pin extending through the apertures in the first pair of base knuckles and the first pair of latch knuckles; and
(d) a first torsion spring arranged to rotationally bias the first latch about the first hinge pin and into releasable engagement with the housing.

10. The portable electronic device as recited in claim 9 wherein at least one of the latch knuckles of the first pair of latch knuckles limits rotational motion of the first latch in a second direction.

11. The portable electronic device as recited in claim 9 wherein:
the housing has a first catch on an inside surface of the housing; and
the first latch has a first tab projecting therefrom and releasably engaging the first catch.

12. The portable electronic device as recited in claim 9 further comprising a second latch assembly that comprises:
a second base secured to the inside surface of the cover and having a second pair of base knuckles projecting from the second base, each knuckle of the second pair of base knuckles having a separate aperture there through;
a second latch including a second plate from which projects a second pair of latch knuckles each having a separate aperture there through, and including a second stop projecting from the second plate for engaging a second surface of a second edge of the cover to limit rotational motion of the second plate in one direction, wherein the second surface faces toward the housing;
a second hinge pin extending through the apertures in the second pair of base knuckles and the second pair of latch knuckles; and
a second torsion spring arranged to rotationally bias the second latch about the second hinge pin and into releasable engagement with the housing.

13. The portable electronic device as recited in claim 9 wherein the first base is secured to a portion of the inside surface of the cover wherein said portion extends over the opening of the housing.

14. The portable electronic device as recited in claim 9 wherein the first stop projects laterally from the first plate parallel to the edge of the cover.

15. A portable electronic device comprising:
a housing having a compartment adapted for containing a battery to power the portable electronic device and having an opening into the compartment, wherein the housing has a first catch area and a second catch area;
a cover detachably attached to the housing and having an inside surface with a portion extending over the opening;
a first latch assembly comprising a first latch with a first plate and a first hinge mounted on the first plate and mounted on the portion of the inside surface of the cover, wherein the first latch has a first rotational position in which the first latch contacts the first catch area and has a second rotational position in which the first latch is remote from the first catch area, wherein the first hinge comprises a first element that limits rotational motion in a direction toward the second rotational position, and the first latch assembly further comprising a first stop projecting from the first plate for engaging a first surface of a first edge of the cover to limit rotational motion in a direction toward the first rotational position, wherein the first surface faces toward the housing; and
a second latch assembly comprising a second latch with a second plate and a second hinge mounted on the second plate and mounted on the portion of the inside surface of the cover, wherein the second latch has one rotational position in which the second latch contacts the second catch area and has another rotational position in which the second latch is remote from the second catch area, and wherein the second hinge comprises a second element that limits rotational motion in a direction toward the another rotational position, and the second latch assembly having a second stop projecting from the second plate for engaging a second surface of a second edge of the cover to limit rotational motion in a direction toward the one rotational position, wherein the second surface faces toward the housing.

16. The portable electronic device as recited in claim 15 wherein the first latch assembly further comprises a first spring that biases the first latch toward the first rotational position; and the second latch assembly further comprises a second spring that biases the second latch toward the one rotational position.

17. The portable electronic device as recited in claim 15 wherein each of the first latch and the second latch has a plate from which a first and a second pair of latch knuckles, respectively, project.

18. The portable electronic device as recited in claim 17 wherein in the first latch assembly, the first element is on one of the latch knuckles of the first pair of latch knuckles; and in the second latch assembly, the second element is on one of the latch knuckles of the second pair of latch knuckles.

19. The portable electronic device as recited in claim 15 wherein the first latch has a first tab projecting therefrom and releasably contacting the first catch area; and the second latch has a second tab projecting therefrom and releasably contacting the second catch area.

20. The portable electronic device as recited in claim 15 wherein the first and second latch assemblies are located on opposing edges of the cover.

21. The portable electronic device as recited in claim 15 wherein each of the first and second hinges comprises a pair of latch knuckles attached to one of the first and second latches and each having an aperture therein, a pair of base knuckles attached to the inside surface of the cover and each having an aperture therein, a hinge pin extending through the apertures in the pair of latch knuckles and the pair of base knuckles, and wherein one of the latch knuckles in each of the first and second hinges has a cam surface that forms one of the first element or the second element and which strikes one of the cover and a member affixed to the cover.

22. The portable electronic device as recited in claim 15 wherein the first catch area and the second catch area are on inside surfaces of the housing.

* * * * *